(12) United States Patent
Shibutani et al.

(10) Patent No.: US 10,356,666 B2
(45) Date of Patent: Jul. 16, 2019

(54) COMMUNICATION DEVICE AND COMMUNICATION CONTROL METHOD

(71) Applicant: NTT DOCOMO, INC., Chiyoda-ku (JP)

(72) Inventors: Akira Shibutani, Chiyoda-ku (JP); Kazuma Nachi, Chiyoda-ku (JP); Yuuta Higuchi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 245 days.

(21) Appl. No.: 15/118,976

(22) PCT Filed: May 8, 2015

(86) PCT No.: PCT/JP2015/063348
§ 371 (c)(1),
(2) Date: Aug. 15, 2016

(87) PCT Pub. No.: WO2015/190194
PCT Pub. Date: Dec. 17, 2015

(65) Prior Publication Data
US 2018/0176833 A1    Jun. 21, 2018

(30) Foreign Application Priority Data
Jun. 9, 2014 (JP) .................. 2014-118528

(51) Int. Cl.
H04W 72/04 (2009.01)
H04W 36/00 (2009.01)
H04W 76/30 (2018.01)
H04W 8/08 (2009.01)
H04W 36/38 (2009.01)
H04M 1/725 (2006.01)
H04W 4/80 (2018.01)

(52) U.S. Cl.
CPC ..... *H04W 36/0011* (2013.01); *H04M 1/7253* (2013.01); *H04M 1/72569* (2013.01);
(Continued)

(58) Field of Classification Search
CPC ... H04W 36/0011; H04W 76/30; H04W 8/08; H04W 36/38; H04W 4/80; H04W 76/021;
(Continued)

(56) References Cited

U.S. PATENT DOCUMENTS

| 7,075,908 B2 * | 7/2006 | Noguchi | ................. | H04W 8/26 370/329 |
| 2002/0085719 A1 * | 7/2002 | Crosbie | ............. | H04W 36/0011 380/248 |

(Continued)

FOREIGN PATENT DOCUMENTS

| JP | 2002-149510 A | 5/2002 |
| JP | 2006-148648 A | 6/2006 |

(Continued)

OTHER PUBLICATIONS

Office Action dated Jul. 11, 2017 in Japanese Patent Application No. 2016-527692 (with unedited computer generated English translation).

(Continued)

*Primary Examiner* — Hassan Kizou
*Assistant Examiner* — Mahbubul Bar Chowdhury
(74) *Attorney, Agent, or Firm* — Oblon, McClelland, Maier & Neustadt, L.L.P.

(57) ABSTRACT

A module includes a switching request receiving unit configured to receive, when the module is connected with one terminal, a switching request indicating a connection switching to another terminal, an address changing unit configured to change the connection destination address using the reception of the switching request by the switching request receiving unit as a trigger, a connection disconnecting unit configured to forcibly disconnect the connection with the one terminal when the connection destination address is changed by the address changing unit, and a connection (Continued)

process executing unit configured to receive a connection request from the another terminal by the connection destination address changed by the address changing unit after the connection with the one terminal is disconnected by the connection disconnecting unit and to connect with the another terminal.

6 Claims, 6 Drawing Sheets

(51) Int. Cl.
(52) U.S. Cl.
    CPC .......... *H04W 8/08* (2013.01); *H04W 36/38* (2013.01); *H04W 76/30* (2018.02); *H04M 2250/02* (2013.01); *H04M 2250/04* (2013.01); *H04M 2250/06* (2013.01); *H04W 4/80* (2018.02)
(58) Field of Classification Search
    CPC .......... H04W 36/0005; H04W 36/36; H04W 36/365; H04W 88/06
    See application file for complete search history.

(56) References Cited

U.S. PATENT DOCUMENTS

| | | |
|---|---|---|
| 2006/0109839 A1 | 5/2006 | Hino et al. |
| 2010/0128696 A1* | 5/2010 | Fantini .............. H04L 29/12028 370/331 |
| 2011/0151788 A1* | 6/2011 | Castrogiovanni ..... H04W 76/23 455/41.2 |
| 2011/0153845 A1* | 6/2011 | Rao .......................... H04L 12/44 709/228 |
| 2012/0084446 A1* | 4/2012 | Iinuma .................. H04W 36/00 709/227 |
| 2012/0203916 A1* | 8/2012 | Burns ................. H04L 29/1249 709/227 |
| 2013/0029604 A1* | 1/2013 | Saito ................... H04W 76/028 455/41.2 |
| 2014/0113562 A1* | 4/2014 | Lee ....................... H04W 8/005 455/41.2 |

FOREIGN PATENT DOCUMENTS

| | | |
|---|---|---|
| JP | 2012-227871 A | 11/2012 |
| JP | 2014-53725 A | 3/2014 |

OTHER PUBLICATIONS

English translation of the International Preliminary Report on Patentability and Written Opinion dated Dec. 22, 2016 in PCT/JP2015/063348.

International Search Report dated Jul. 21, 2015 for PCT/JP2015/063348 filed May 8, 2015.

Extended European Search Report dated May 29, 2017 in Patent Application No. 15806270.3.

* cited by examiner

Fig.6
(a)
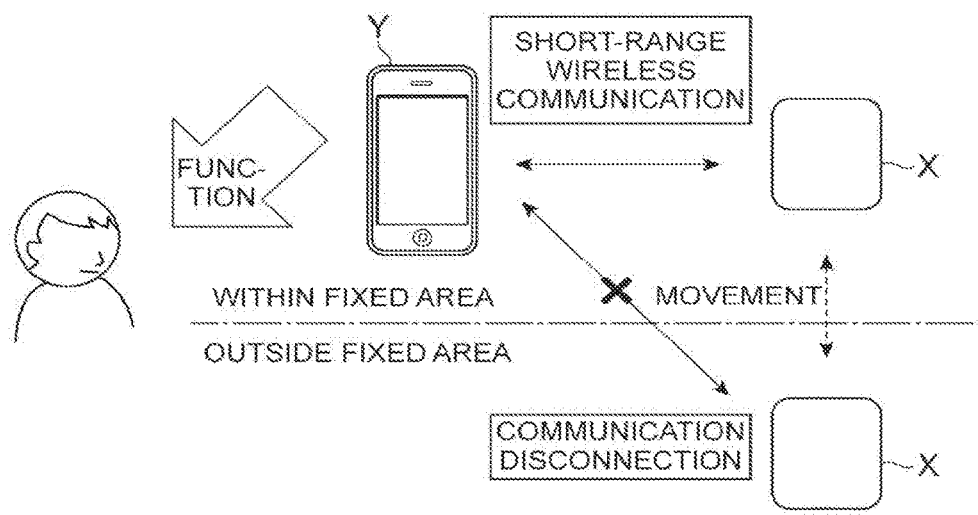
(b)
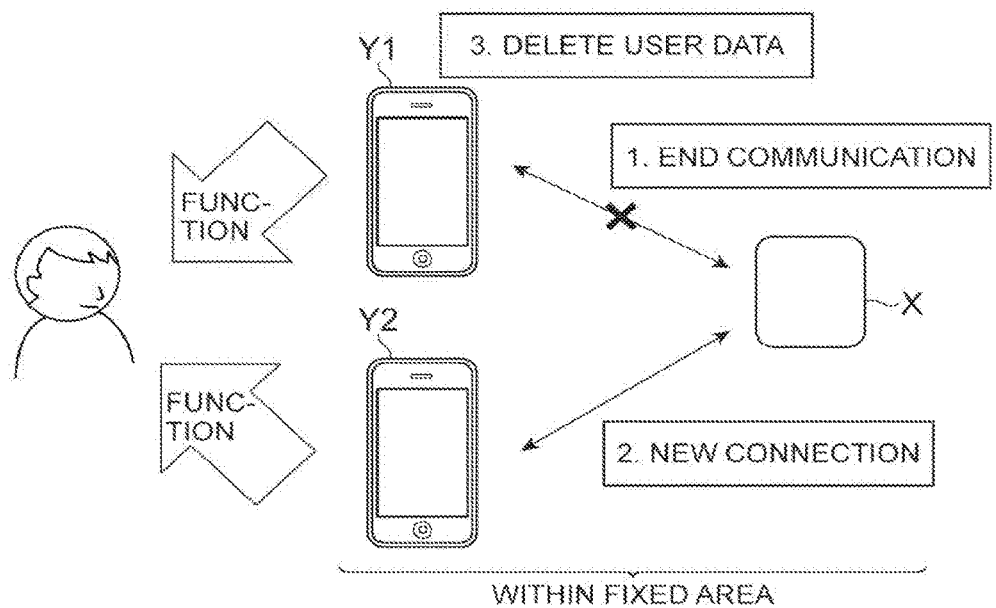

COMMUNICATION DEVICE AND COMMUNICATION CONTROL METHOD

TECHNICAL FIELD

An aspect of the present invention relates to a communication device and a communication control method for performing data communication with terminals using short-range wireless communication.

BACKGROUND ART

Conventionally, a small-size module (hereinafter simply referred to as a "module") which is connected with a terminal such as a mobile terminal, which is represented by a smartphone, to perform data communication using, for example, a short-range wireless communication means such as Bluetooth (registered trademark) and NFC is known. The module is connected to be able to communicate with the terminal and therefore provides a user with various functions (for example, a function such as mobile network communication) via the terminal.

In the following Patent Literature 1, a client-server system in which a server and one or more clients are connected using Bluetooth (registered trademark) and mutually perform information communication is disclosed. In this client-server system, the server forcibly disconnects the connection of the currently connected client if clients of a number capable of being simultaneously connected are already connected when a new client is connected.

CITATION LIST

Patent Literature

[Patent Literature 1] Japanese Unexamined Patent Publication No. 2002-149510

SUMMARY OF INVENTION

Technical Problem

As illustrated in FIG. 6(*a*), a connection between a module X and a terminal Y is generally disconnected and restored as follows. That is, when the terminal Y is outside a fixed area (out of the fixed area) in which radio waves of the module X can be received, the connection between the module X and the terminal Y is disconnected. On the other hand, when the terminal Y returns inside the fixed area (within the fixed area), the connection between the module X and the terminal Y is automatically restored. Such an automatic restoration of a connection is implemented, for example, as follows. That is, after the connection with the module X is disconnected, the terminal Y iteratively searches for the module X (a connection destination address set in the module X). If the terminal Y discovers the module X when returning within the fixed area, the terminal Y transmits a connection request to the module X and re-establishes the connection with the module X.

Among functions provided by the module (for example, the above-mentioned mobile network communication function), a function capable of being provided to only one terminal at a time is also present. When this function is provided by the module, a plurality of terminals cannot be simultaneously connected to the module. On the other hand, the case in which a user possesses a plurality of terminals capable of being connected to the module and desires to use a terminal connected to the module through appropriate switching is considered. In this case, for example, the module executes a process of switching the connected terminal using, for example, a switching manipulation by the user (for example, a touch manipulation of causing a module and a terminal capable of communicating with each other using NFC to be mutually recognized when they are within a fixed distance or less) as a trigger.

As illustrated in FIG. 6(*b*), the module X generally switches the terminal of the connection destination as follows. That is, when the connection is switched from a terminal Y1 to a terminal Y2, the module X first ends communication with the terminal Y1 by disconnecting the connection with the connected terminal Y1 (see "1. End communication" in FIG. 6(*b*)). Thereafter, the module X executes a new connection process on the new terminal Y2 (see "2. New connection" in FIG. 6(*b*)). The terminal Y1 disconnected in the above-mentioned process executes a predetermined disconnection process. For example, the terminal Y1 deletes user information or the like as necessary as a disconnection process (see "3. Delete user data" in FIG. 6(*b*)).

Generally, when the connection with the connected terminal is disconnected, the module transmits a disconnection request to the terminal and executes the disconnection process after a response from the terminal (a completion notification indicating that disconnection preparation is completed) is received. A time taken until the response is transmitted to the module after the terminal receives the disconnection request is not fixed because the time depends upon processing capability, status, or the like of the terminal and a long time may be required until the disconnection process is completed. On the other hand, from the viewpoint of convenience of a user desiring to switch the terminal connected to the module, it is preferable to implement faster connection switching.

Here, implementing high-speed connection switching using a technique of forcibly disconnecting the connection with the terminal as described in the above-mentioned Patent Literature 1 is also considered. However, in the above-mentioned technique, the forcibly disconnected terminal is recognized to be disconnected because the module of a connection destination has moved out of a fixed area and then iteratively searches for the module. Here, there is a problem in that, when the forcibly disconnected terminal discovers a module before a new terminal discovers the module and transmits a connection request, the forcibly disconnected terminal is re-connected to the module and connection switching for the new terminal cannot be implemented.

Therefore, an objective of an aspect of the present invention is to provide a communication device and a communication control method capable of reliably and rapidly performing the switching of a terminal to be connected.

Solution to Problem

A communication device according to an aspect of the present invention is a communication device for performing data communication by connecting with a terminal using short-range wireless communication via a preset connection destination address, the communication device including: a switching request receiving means configured to receive, when the communication device is connected with one terminal, a switching request indicating a connection switching to another terminal; an address changing means configured to change the connection destination address using the reception of the switching request by the switching request receiving means as a trigger; a connection disconnecting means configured to forcibly disconnect the connection with the one terminal when the connection destination address is changed by the address changing means; and a connection process executing means configured to receive a connection request from the other terminal by the connection destination address changed by the address changing means after the connection with the one terminal is disconnected by the connection disconnecting means and to connect with the other terminal.

In the communication device according to the aspect of the present invention, it is possible to increase the speed of connection switching because the connection destination address is changed and the connection with the one terminal is forcibly disconnected using the reception of the switching request by the switching request receiving means as the trigger, and the connection request from the other terminal by the changed connection destination address is received. Also, because the connection destination address is changed, the communication device is not discovered even when the one terminal searches for the communication device using the connection address before the change. As a result, it is possible to reliably prevent the one terminal for re-connecting to the communication device. Thereby, according to the communication device and according to the aspect of the present invention, it is possible to reliably and rapidly perform the switching of a terminal to be connected.

In the communication device, the address changing means may change the connection destination address and notify the other terminal of the changed connection destination address.

According to the above-mentioned communication device, it is possible to transfer the changed connection destination address necessary to connect with the communication device to the other terminal serving as a connection switching destination at a reliable and appropriate timing and more reliably execute connection switching to the other terminal.

In the communication device, while the communication device is connected with the one terminal, the address changing means may pre-acquire a changed destination address of the connection destination address and retain the changed destination address to be referred to. Using the reception of the switching request by the switching request receiving means as the trigger, the address changing means may change the connection destination address to the changed destination address and notify the other terminal of the changed destination address as the changed connection destination address.

According to the above-mentioned communication device, the address changing means previously retains the changed destination address to be referred to, thereby immediately changing the connection destination address to the changed destination address and notifying the other terminal of the changed destination address using the reception of the switching request as the trigger. That is, it is possible to shorten a processing time related to the change of the connection destination address because it is unnecessary for the address changing means to execute a process of calculating an address of a changed destination by a predetermined calculation when the switching request is received. As a result, it is possible to further increase the speed of the connection switching.

In the communication device, the connection disconnecting means may notify the one terminal that the connection is disconnected and disconnect the connection with the one terminal using the notification as a direct trigger when the connection destination address is changed by the address changing means.

According to the above-mentioned communication device, a notification indicating that the connection is disconnected is provided to the one terminal when the connection with the one terminal is disconnected. Thereby, it is possible to cause the one terminal to find that the connection with the communication device is disconnected. As a result, it is possible to prevent an ineffective process of searching for the communication device from being executed by the one terminal and save power of the one terminal. On the other hand, because the communication device disconnects the connection with the one terminal without waiting for a response to the disconnection notification from the one terminal and the connection request by the changed connection destination address can be received, the speed of the connection switching also increases.

In the communication device, the connection disconnecting means may transmit a disconnection request to the one terminal and disconnect the connection with the one terminal using a reception of a response to the disconnection request from the one terminal as a trigger if the connection with the one terminal is disconnected when no switching request is received by the switching request receiving means.

If the connection with the one terminal is disconnected when no switching request is received, it is unnecessary to rapidly disconnect the connection with the one terminal. Accordingly, according to the above-mentioned communication device, it is possible to disconnect the connection with the one terminal by a more preferable normal process as a disconnection process when it is unnecessary to rapidly disconnect the connection with the one terminal. Thereby, it is possible to prevent the unnecessary process of searching for the communication device from being executed by the one terminal.

In the communication device, the switching request receiving means may receive, when the communication device is connected with the one terminal using first short-range wireless communication, the switching request indicating a connection switching to the other terminal using second short-range wireless communication different from the first short-range wireless communication, the address changing means may notify the other terminal of the changed connection destination address using the second short-range wireless communication, and the connection process executing means may receive the connection request from the other terminal by the changed connection destination address using the first short-range wireless communication and may connect with the other terminal using the first short-range wireless communication.

According to the above-mentioned communication device, the switching request for the other terminal is received using the second short-range wireless communication different from the first short-range wireless communication. Thereby, for example, even when the connection with the communication device using the first short-range wireless communication is occupied by the one terminal and the other terminal cannot be connected with the communication device using the first short-range wireless communication, it is possible to receive the switching request from the other terminal. Also, for example, even when an authentication process (for example, an input of a password or the like) is necessary to establish the connection using the first short-range wireless communication, the above-mentioned communication device can further increase convenience of a user because a process of exchanging information necessary for the authentication process at a time of the switching request using the second short-range wireless communication can be implemented.

The present invention can be described as an invention of the communication device as mentioned above. Also, the present invention can be described as an invention of a communication control method as follows. Because these inventions are only different in terms of a category and are substantially the same as each other, similar operations and effects are exhibited.

That is, a communication control method according to the present invention is a communication control method to be executed by a communication device for performing data communication by connecting with a terminal using short-range wireless communication via a preset connection destination address, the communication control method including: a switching request receiving step of receiving, when the communication device is connected with one terminal, a switching request indicating a connection switching to another terminal; an address changing step of changing a connection destination address using the reception of the switching request in the switching request receiving step as a trigger; a connection disconnecting step of forcibly disconnecting the connection with the one terminal when the connection destination address is changed in the address changing step; and a connection process executing step of receiving a connection request from the other terminal by the connection destination address changed in the address changing step after the connection with the one terminal is disconnected in the connection disconnecting step and connecting with the other terminal.

Advantageous Effects of Invention

According to an aspect of the present invention, it is possible to provide a communication device and a communication control method capable of reliably and rapidly performing switching of a terminal to be connected.

BRIEF DESCRIPTION OF DRAWINGS

FIG. 6 is an explanatory diagram illustrating a disconnection and restoration of a conventional connection between a module and a terminal and a conventional connection switching operation.

DESCRIPTION OF EMBODIMENTS

An embodiment of the present invention will be described with reference to the drawings. Also, the same parts are assigned the same reference signs if possible and redundant description thereof will be omitted.

Figure 1:
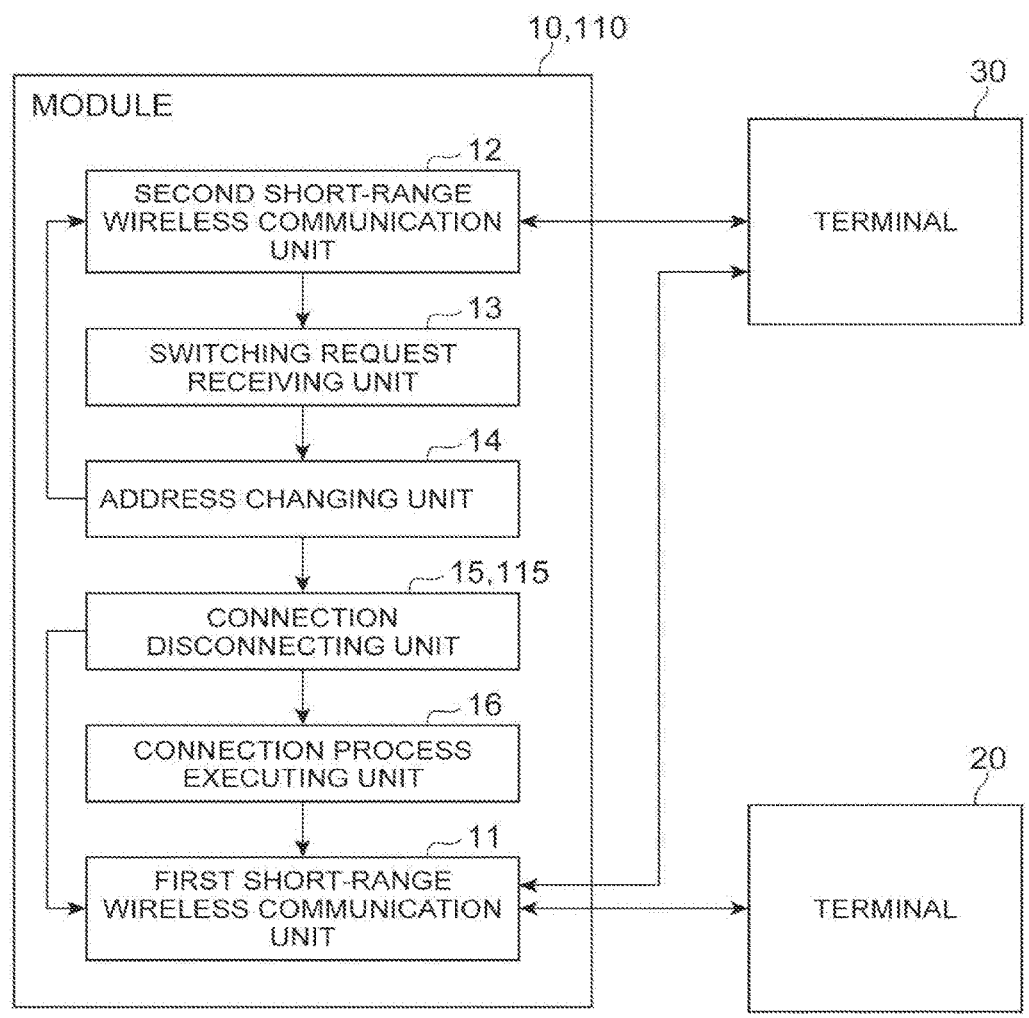
FIG. 1 is a block diagram illustrating a functional configuration of a module according to an embodiment of the present invention.

FIG. 1 is a block diagram illustrating a functional configuration of a module which is a communication device according to an embodiment of the present invention. As illustrated in FIG. 1, a module 10 according to the present embodiment is a communication device capable of performing data communication by connecting with terminals 20 and 30 within a fixed area in which radio waves from the module 10 can be received using short-range wireless communication. In the present embodiment, a state in which the module 10 and the terminals 20 and 30 are carried by the same user and the terminals 20 and 30 connected to the module 10 by a user's switching manipulation are used through appropriate switching is mainly assumed.

The module 10 is configured, for example, as a small-size device carried by the user. Also, the module 10 may be configured, for example, as a wearable device type of a wristwatch, wristband, necklace, or the like mounted on a human body of the user. The module 10 includes a means (a first short-range wireless communication unit 11 to be described below) for executing short-range wireless communication (first short-range wireless communication) by, for example, Bluetooth (registered trademark), and a means (a second short-range wireless communication unit 12 to be described below) for executing short-range wireless communication (second short-range wireless communication) by, for example, NFC.

The terminals 20 and 30 are information terminals, for example, such as a smartphone, a portable phone, a PDA, a tablet terminal, etc. The terminals 20 and 30 include means for executing the first short-range wireless communication and the second short-range wireless communication as in the module 10. Also, the terminals 20 and 30 include a mobile communication function of connecting to a mobile network using information (ID information or the like) provided from the module 10.

A connection using the first short-range wireless communication between the module 10 and a terminal (the terminal 20 as an example) will be described. The module 10 and the terminal 20 are connected using the first short-range wireless communication via a connection destination address set in the module 10. Here, the connection destination address includes connection destination information such as an address for specifying the module 10 or an address associated with a specific service provided by the module 10. Also, the connection destination address is configured to be able to be freely set and changed in the module 10, and the set and changed connection destination address is stored in a memory 10B or the like.

The module 10 periodically broadcasts device information including a connection destination address (a connection destination address stored in the memory 10B or the like) set in the communication device using the first short-range wireless communication. The connection between the module 10 and the terminal 20 is basically established as follows. That is, the terminal 20 transmits a connection request using the connection destination address included in the device information broadcast by the module 10 as a destination. The module 10 receives the connection request from the terminal 20 and establishes a connection with the terminal 20 which is a sender of the connection request.

In the present embodiment, as an example, the terminal 20 pre-acquires the connection destination address of the module 10 using a predetermined method (communication with the module 10 using the second short-range wireless communication as an example in the present embodiment). In this case, when the terminal 20 receives the device information broadcast by the module 10, whether the acquired connection destination address matches the connection destination address included in the device information is determined.

When the acquired connection destination address matches the connection destination address included in the device information, the terminal 20 designates the connection destination address of the module 10 as the destination and transmits a request for establishing a connection (a connection request) using the first short-range wireless communication. Thereafter, the module 10 receiving the connection request in which the connection destination address of the communication device is designated as the destination establishes the connection with the terminal 20 using the first short-range wireless communication. Thereby, a communication path in which data communication is possible is established using the first short-range wireless communication between the module 10 and the terminal 20. Also, when the module 10 and the terminals 20 and 30 are merely described as being "connected" in the subsequent description, this indicates that the module 10 and the terminals 20 and 30 are "connected using the first short-range wireless communication" unless specifically noted otherwise.

An effective range in which radio waves of the first short-range wireless communication can be received is within, for example, a radius of 10 m from the device, and an effective range in which radio waves of the second short-range wireless communication can be received is less than the effective range of the first short-range wireless communication, and is within, for example, several cm from the device. In the present embodiment, the first short-range wireless communication and the second short-range wireless communication are used as follows. That is, data communication related to a function provided by the module 10 (a service provided by the module 10 such as a mobile network communication function) is performed between the module 10 and the terminals 20 and 30 using the first short-range wireless communication in which the effective range is larger. On the other hand, data communication related to a process of switching the terminals 20 and 30 to be connected to the module 10 (details will be described below) is performed using the second short-range wireless communication in which the effective range is smaller.

The module 10 includes, for example, an SIM card or the like on which a unique ID number for specifying a phone number for performing mobile network communication is recorded, and provides information such as an ID number necessary for the mobile network communication to one terminal (the terminal 20 or 30) connected one-to-one with the module 10. The terminal connected with the module 10 can perform the mobile network communication by executing a mobile communication function provided in the communication device using the information such as the ID number acquired from the module 10.

In the present embodiment, the module 10 cannot be simultaneously connected with a plurality of terminals 20 and 30 and it is necessary for the user to connect a terminal (the terminal 20 or 30) desired to perform mobile network communication with the module 10. More specifically, when one terminal 20 is connected to the module 10, it is necessary for the user to connect the module 10 and the terminal 30 after disconnecting the connection between the module 10 and the terminal 20 if it is necessary to cause the other terminal 30 to perform mobile network communication. That is, it is necessary to switch the connection with the module 10 from the terminal 20 to the terminal 30.

As mentioned above, in the present embodiment, the second short-range wireless communication is used to perform switching between the terminals 20 and 30 to be connected to the module 10. Specifically, when the user executes a touch manipulation of holding the terminal (here, the terminal 30 as an example) in proximity within the effective range of the second short-range wireless communication of the module 10, the terminal 30 discovers the module 10 using the second short-range wireless communication and executes a predetermined switching process. Details of the switching process will be described together with description of a functional configuration of the module 10.

Next, the functional configuration and a hardware configuration of the module 10 will be described using FIGS. 1 and 2. As illustrated in FIG. 1, the module 10 includes the first short-range wireless communication unit 11, the second short-range wireless communication unit 12, a switching request receiving unit 13, an address changing unit 14, a connection disconnecting unit 15, and a connection process executing unit 16 as functional components.

Figure 2:
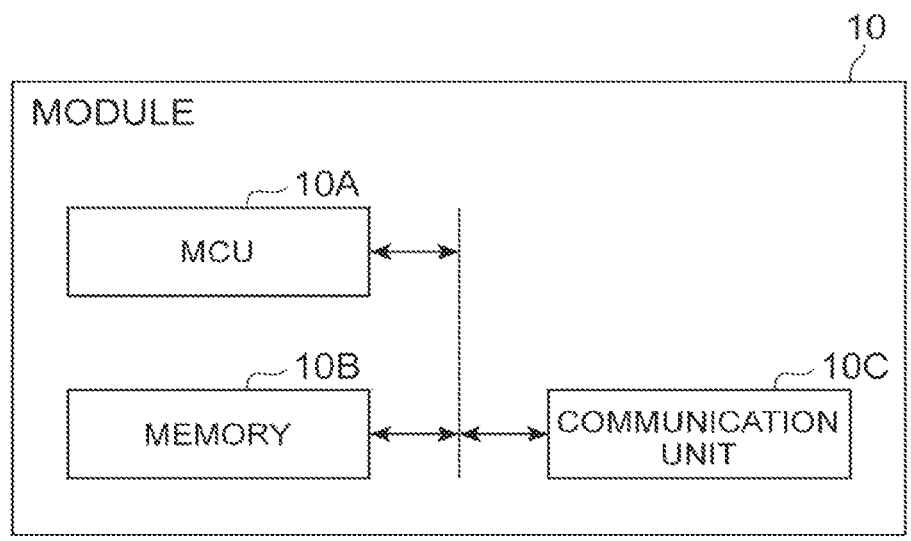
FIG. 2 is a block diagram illustrating a hardware configuration of the module illustrated in FIG. 1.

Also, as illustrated in FIG. 2, the module 10 includes a micro control unit (MCU) 10A, the memory 10B, and a communication unit 10C including a hardware part for performing the above-mentioned first short-range wireless communication and second short-range wireless communication as main hardware components. Also, the module 10 may include a hardware element other than the above-mentioned hardware. In the present embodiment, hardware such as the above-mentioned SIM card is embedded in the module 10. Each function of the module 10 illustrated in FIG. 1 is implemented by loading a predetermined program in the memory 10B or the like under control of the MCU 10A and executing the predetermined program and operating the communication unit 10C by the MCU 10A.

The first short-range wireless communication unit 11 is a means which is connected to the terminals 20 and 30 using the first short-range wireless communication and performs data communication with the terminals 20 and 30. The first short-range wireless communication unit 11 executes data communication related to a function mainly provided by the module 10 (a service provided by the module 10 such as the mobile network communication function). Specifically, as mentioned above, the first short-range wireless communication unit 11 transmits information such as an ID number necessary to perform the mobile network communication to a terminal (the terminal 20 or 30) for which a connection using the first short-range wireless communication is established. Also, the first short-range wireless communication unit 11 broadcasts device information including a connection destination address of the module 10 (a connection destination address stored in the memory 10B or the like) when the module 10 is not connected with any terminals and is in a connection request waiting state in which a new connection request can be received.

Also, the module 10 is in the above-mentioned connection request waiting state when, for example, a switching request and a connection request are received by predetermined user manipulations (for example, a switching manipulation, an initial connection manipulation, etc.) or when the connection with the terminal is forcibly disconnected by radio wave interference, etc. On the other hand, when the module 10 is not in the above-mentioned connection request waiting state as in the case in which the module 10 is not connected to any terminal, the module 10 is in a standby state. When the module 10 is in the standby state, the first short-range wireless communication unit 11 does not broadcast the device information.

The second short-range wireless communication unit 12 is a means which is connected to the terminals 20 and 30 using the second short-range wireless communication and performs data communication with the terminals 20 and 30. The second short-range wireless communication unit 12 mainly performs the reception of switching requests from the terminals 20 and 30 and the transmission of a connection destination address for the terminals 20 and 30 (details will be described below).

The switching request receiving unit 13 is a switching request receiving means for receiving, when the communication device (the module 10) is connected to one terminal 20, a switching request indicating a connection switching to the other terminal 30. Specifically, the switching request receiving unit 13 receives the switching request from the terminal 30 via the second short-range wireless communication unit 12. Hereinafter, an example of a series of processes in which the switching request receiving unit 13 receives the switching request from the terminal 30 will be described.

If the user executes a touch manipulation of holding the terminal 30 in proximity within an effective range of the second short-range wireless communication of the module 10 when the module 10 is connected with the terminal 20 via the first short-range wireless communication unit 11, the terminal 30 discovers the module 10 using the second short-range wireless communication via the second short-range wireless communication unit 12. Next, the terminal 30 executes a predetermined switching process which is a process to be executed when the module 10 is discovered using the second short-range wireless communication. Specifically, the terminal 30 transmits the switching request to the module 10 using the second short-range wireless communication. The switching request transmitted from the terminal 30 is received by the second short-range wireless communication unit 12 and transferred from the second short-range wireless communication unit 12 to the switching request receiving unit 13. Thereby, the switching request receiving unit 13 receives the switching request from the terminal 30.

The address changing unit 14 is an address changing means for changing a connection destination address using the reception of the switching request by the switching request receiving unit 13 as a trigger. Specifically, the address changing unit 14 changes the connection destination address set in the module 10, that is, the connection destination address used in the connection with the terminal 20, to another connection destination address using the reception of the switching request as the trigger.

Also, the address changing unit 14 changes the connection destination address and notifies the terminal 30 of the changed connection destination address. Specifically, the address changing unit 14 notifies the terminal 30 of the changed connection destination address using the second short-range wireless communication via the second short-range wireless communication unit 12.

As an example in the present embodiment, the address changing unit 14 executes the change and notification of a connection destination address as follows. The address changing unit 14 pre-acquires a changed destination address for the connection destination address and retains the changed destination address so that the changed destination address can be referred to while the communication device is connected with the terminal 20. For example, the address changing unit 14 calculates the changed destination address by executing a predetermined calculation using the establishment of a connection of the communication device with the terminal 20 as a trigger, and stores the changed destination address in the memory 10B or the like. The address changing unit 14 refers to the changed destination address stored in the memory 10B or the like using the reception of the switching request by the switching request receiving unit 13 as a trigger, changes the connection destination address to the changed destination address, and notifies the terminal 30 of the changed destination address as the changed connection destination address via the second short-range wireless communication unit 12.

The connection disconnecting unit 15 is a connection disconnecting means for forcibly disconnecting the connection with the terminal 20 when the connection destination address is changed by the address changing unit 14. Specifically, the connection disconnecting unit 15 forcibly disconnects the connection with the terminal 20 using, for example, the change of the connection destination address by the address changing unit 14 as a trigger. Here, the phrase "connection with the terminal 20 is forcibly disconnected" indicates that the connection established with the terminal 20 using the first short-range wireless communication is unilaterally disconnected without confirming whether the connection with the terminal 20 may be disconnected or not (that is, without waiting for the reception of a message indicating that the connection may be disconnected from the terminal 20). As an example in the present embodiment, the connection disconnecting unit 15 unilaterally disconnects the connection established with the terminal 20 using the first short-range wireless communication without transmitting an inquiry (a disconnection request) about whether the connection may be disconnected to the terminal 20.

Here, the connection with the terminal 20 being disconnected indicates a transition from a state in which the module 10 and the terminal 20 are connected (for example, a state in which information related to the connection with the terminal 20 is stored in the memory 10B or the like) to a state in which the module 10 is not connected to the terminal 20 (for example, a state in which the information related to the connection with the terminal 20 is not stored in the memory 10B or the like). More specifically, the connection with the terminal 20 is disconnected, for example, by deleting information related to the connection with the terminal 20 stored in the memory 10B or the like.

The significance of the connection disconnecting unit 15 forcibly disconnecting the connection with the terminal 20 will be described. First, when the connection with the terminal 20 is disconnected, the case in which an inquiry about whether a disconnection may be performed (a disconnection request) is transmitted to the terminal 20 and the disconnection is performed after a response indicating that the disconnection may be performed is received from the terminal 20 is considered. When the connection with the terminal 20 is disconnected, there is a problem in that a long time passes until the connection with the terminal 20 is completely disconnected if such a disconnection process (a normal disconnection process) is executed. A time which passes until the terminal 20 sends a response to the module 10 after receiving the disconnection request is not fixed because the time depends upon the processing capability, status, and the like of the terminal 20.

Also, until the connection with the terminal 20 is disconnected, the connection process executing unit 16, which will be described below, cannot establish a connection with the terminal 30 of the connection switching destination. Thus, when the time which passes until a process of a disconnection from the terminal 20 is completed is lengthened, a time until the connection switching for the terminal 30 is completed is lengthened and the convenience of the user desiring the connection switching for the terminal 30 is impaired. Therefore, as mentioned above, the connection disconnecting unit 15 can shorten a time taken to perform the process of the disconnection from the terminal 20 by forcibly disconnecting the connection with the terminal 20 (that is, omitting the normal disconnection process) without transmitting a disconnection request to the terminal 20. As a result, it is possible to increase the speed of connection switching for the terminal 30 and improve the convenience of the user.

On the other hand, if the connection with the terminal 20 is disconnected when no switching request is received by the switching request receiving unit 13, it is unnecessary to rapidly disconnect the connection with the terminal 20. Accordingly, the connection disconnecting unit 15 disconnects the connection with the terminal 20 in the normal disconnection process when the change of the connection destination address by the address changing unit 14 does not serve as a trigger for disconnecting the connection with the terminal 20. Thereby, when it is unnecessary to rapidly disconnect the connection with the terminal 20, it is possible to disconnect the connection with the terminal 20 in the more preferable normal disconnection process as the disconnection process. As a result, it is possible to prevent a process of searching for the module 10 from being unnecessarily executed by the terminal 20. Also, there are, for example, a case in which a user manipulation on the module 10 or the terminal 20 serves as a trigger for disconnecting the connection, a case in which a timeout when a period of non-data-communication is equal to or greater than a fixed period serves as the trigger for disconnecting the connection, etc. as a case in which the change of the connection destination address by the address changing unit 14 does not serve as the trigger for disconnecting the connection with the terminal 20. Also, when the normal disconnection process is executed, the connection disconnecting unit 15 causes the module 10 to transition to the above-mentioned standby state. Also, the connection disconnecting unit 15 may cause the module 10 to transition to the above-mentioned connection request waiting state immediately after the normal disconnection process is executed.

The connection process executing unit 16 is a connection process executing means for receiving a connection request (a request for establishing a connection using the first short-range wireless communication) from the terminal 30 using a connection destination address changed by the address changing unit 14 (a changed connection destination address stored in the memory 10B or the like) after the connection with the terminal 20 is forcibly disconnected by the connection disconnecting unit 15 and establishing the connection with the terminal 30. Also, when the connection request for which the changed connection destination address does not serve as a destination is received via the first short-range wireless communication unit 11, the connection process executing unit 16 does not receive the connection request by, for example, discarding the connection request or the like. Hereinafter, a series of processes by the connection process executing unit 16 until the connection between the module 10 and the terminal 30 is established after the connection between the module 10 and the terminal 20 is disconnected will be described.

The connection process executing unit 16 periodically broadcasts device information including the changed connection destination address via the first short-range wireless communication unit 11 using the first short-range wireless communication after the connection with the terminal 20 is forcibly disconnected. That is, when the connection with the terminal 20 is forcibly disconnected by the connection disconnecting unit 15, the connection process executing unit 16 causes the module 10 to transition to the above-mentioned connection request waiting state. Thus, the device information broadcast from the module 10 is received by the terminals 20 and 30 within a fixed area in which radio waves can be received from the module 10 using the first short-range wireless communication.

Here, an operation of a terminal 20 from which the connection is forcibly disconnected by the connection disconnecting unit 15 will be described. When viewed from the terminal 20, an inquiry about whether the connection may be disconnected is not received from the module 10 and the connection with the module 10 is disconnected. Thus, the terminal 20 misidentifies that a temporary failure of reception of radio waves of the module 10 is a cause of the disconnection. In this case, the terminal 20 searches for the module 10 to reconnect to the module 10 when radio waves of the module 10 are received again. Specifically, the terminal 20 receives the device information broadcast by the module 10 and searches for device information including a connection destination address used in the connection with the module 10 from the received device information.

When the connection destination address is included in the device information, the terminal 20 transmits the connection request to the module 10 using the first short-range wireless communication. However, because the changed connection destination address is included in the device information broadcast by the module 10, the terminal 20 cannot discover the device information including the connection destination address used in the connection with the module 10. Accordingly, the terminal 20 iteratively executes a search for, for example, a predetermined time, stops the search after a time-out, and executes a predetermined disconnection process (for example, a preset process such as deletion of user data).

Next, an operation of the terminal 30 which is notified of the connection destination address changed by the address changing unit 14 will be described. The terminal 30 executes a search using the changed connection destination address for connecting to the module 10 as part of a predetermined switching process. That is, the terminal 30 receives the device information broadcast by the module 10 and searches for device information including the changed connection destination address from the received device information.

As mentioned above, the device information broadcast by the module 10 includes the changed connection destination address. Accordingly, the terminal 30 discovers the device information including the changed connection destination address and transmits a connection request through the first short-range wireless communication using the changed connection destination address as the destination. Thereafter, the connection process executing unit 16 receives the connection request for which the connection destination address set in the module 10 (the changed connection destination address) serves as the destination from the terminal 30 via the first short-range wireless communication unit 11 and establishes the connection with the terminal 30. Using the connection process of the connection process executing unit 16, the connection switching from the terminal 20 to the terminal 30 is completed.

Figure 3:
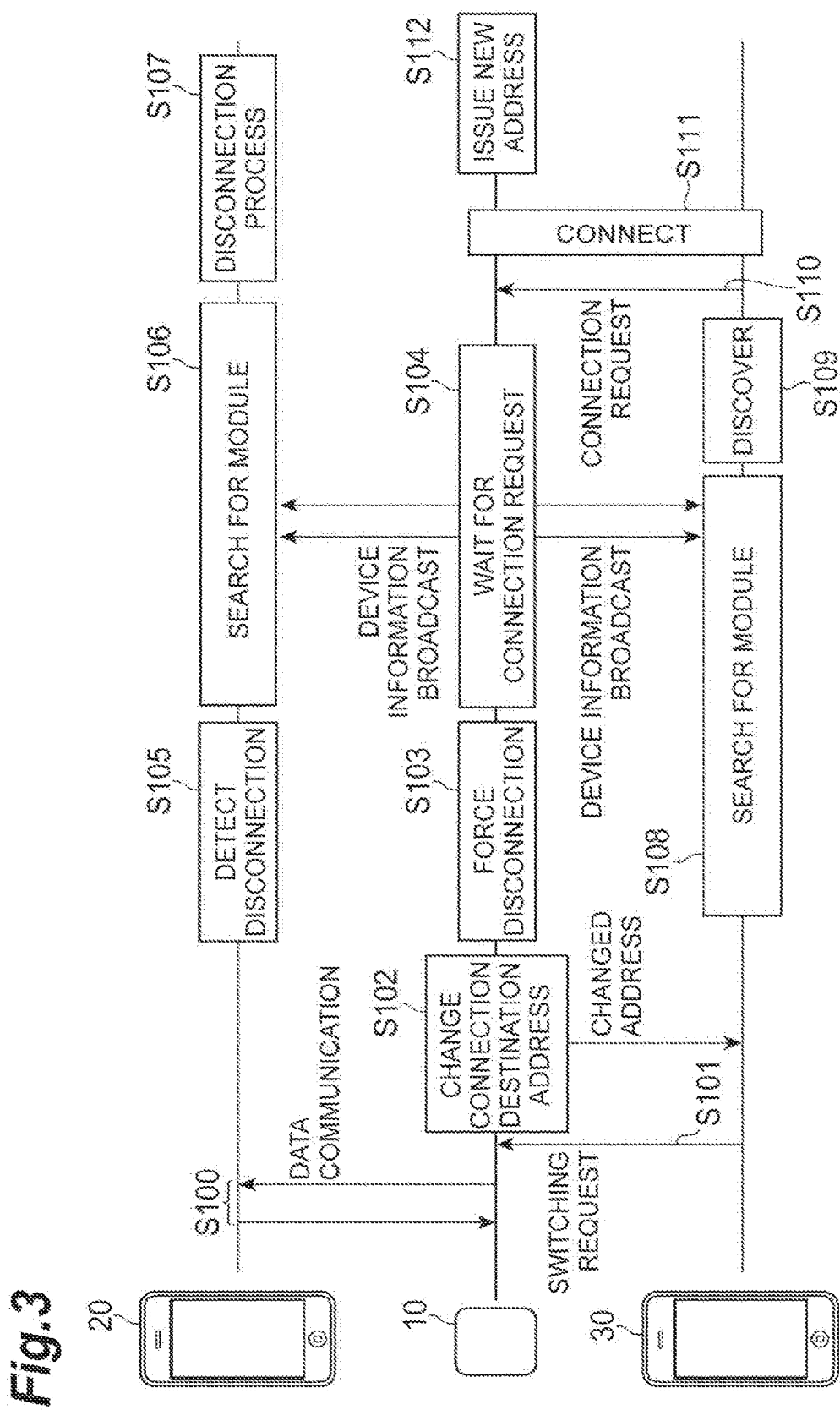
FIG. 3 is a sequence diagram illustrating a series of processes related to connection switching of the module according to the present embodiment.

Next, a connection switching process of the module 10 (including a communication control method by the module 10 according to the present embodiment) will be described using FIG. 3. FIG. 3 is a sequence diagram illustrating a series of processes related to connection switching of the module 10. First, the module 10 is connected with one terminal 20 and data communication using first short-range wireless communication is executed between the module 10 and the terminal 20 (step S100). Next, using a touch manipulation by a user as a trigger, the terminal 30 transmits a switching request to the module 10 using a second short-range wireless communication when the module 10 is discovered using the second short-range wireless communication. The transmitted switching request as mentioned above is received by the switching request receiving unit 13 via the second short-range wireless communication unit 12 (step S101, a switching request receiving step).

Next, using the reception of the switching request by the switching request receiving unit 13 as a trigger, a connection destination address is changed by the address changing unit 14 and the terminal 30 is notified of the changed connection destination address via the first short-range wireless communication unit 11 (step S102, an address changing step). Next, the connection with the terminal 20 is forcibly disconnected by the connection disconnecting unit 15 (step S103, a connection disconnecting step). Thereafter, the module 10 is in a connection request waiting state in which a connection request using the changed connection destination address can be received by the connection process executing unit 16 (step S104). Specifically, the connection process executing unit 16 periodically broadcasts device information including the changed connection destination address via the first short-range wireless communication unit 11.

The terminal 20 from which the connection is forcibly disconnected detects that the connection with the module 10 is disconnected (step S105), but misidentifies that a temporary failure of reception of radio waves of the module 10 is a cause of the disconnection. Thus, the terminal 20 searches for the module 10 to reconnect to the module 10 when the radio waves of the module 10 are received again (step S106). Specifically, the terminal 20 receives the device information broadcast by the module 10 and searches for device information including a connection destination address used in the connection with the module 10 from the received device information. Because the changed connection destination address is included in the device information broadcast by the module 10, the terminal 20 cannot discover the device information including the connection destination address used in the connection with the module 10. Accordingly, the terminal 20 iteratively executes a search for, for example, a predetermined time, stops the search after a time-out, and executes a predetermined disconnection process (for example, a preset process such as deletion of user data) (step S107).

On the other hand, the terminal 30 which is notified of the changed connection destination address executes a search using the changed connection destination address to connect with the module 10 as part of a predetermined switching process (step S108). Specifically, the terminal 30 receives the device information broadcast by the module 10 and searches for device information including the changed connection destination address from the received device information. The device information broadcast by the module 10 includes the changed connection destination address. Accordingly, the terminal 30 discovers the device information including the changed connection destination address (step S109) and transmits a connection request through the first short-range wireless communication using the changed connection destination address as the destination (step S110). Thereafter, the connection process executing unit 16 receives the connection request from the terminal 30 via the first short-range wireless communication unit 11 and establishes a connection with the terminal 30 (step S111, a connection process executing step).

After the connection with the terminal 30 is established, a new address (a changed destination address at a time of a next connection switching) is issued (calculated) by the address changing unit 14 and retained in the memory 10B or the like so that the new address can be referred to (step S112).

Figure 4:
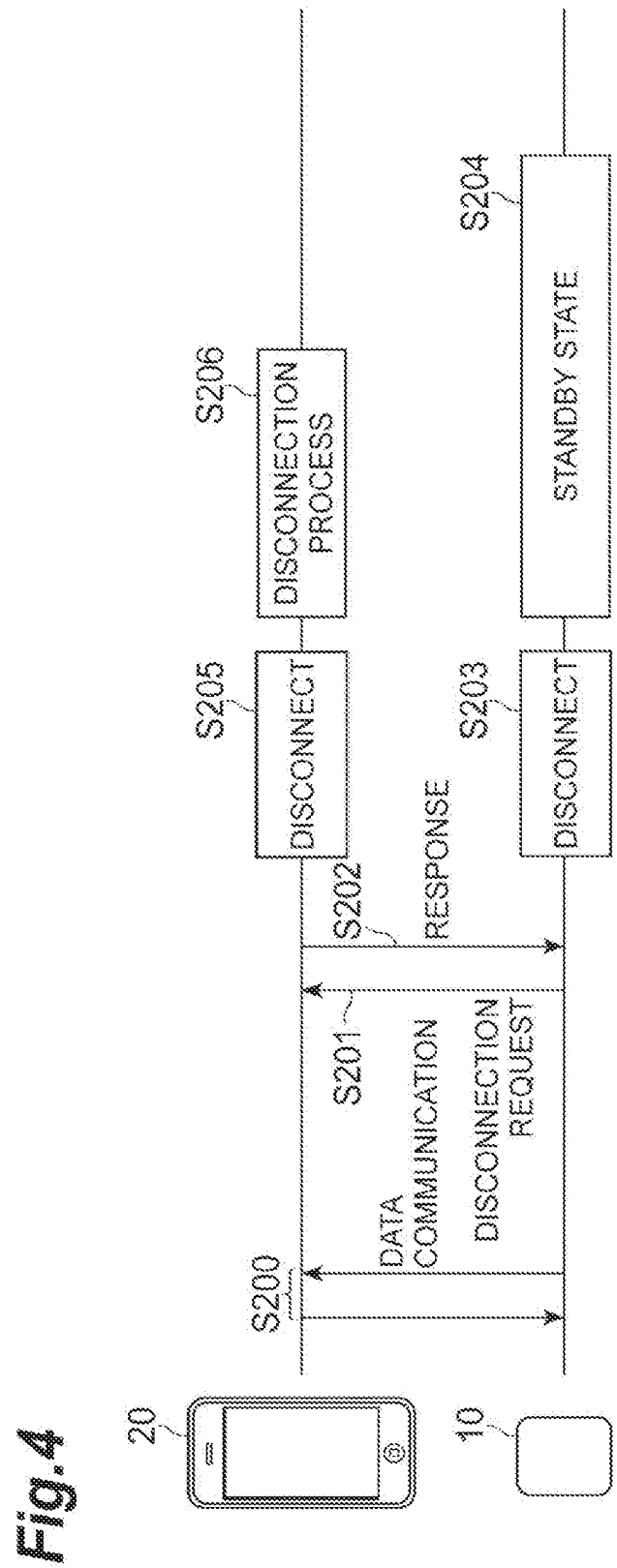
FIG. 4 is a sequence diagram illustrating a normal disconnection process of the module according to the present embodiment.

Next, the normal disconnection process of the module 10 will be described using FIG. 4. FIG. 4 is a sequence diagram illustrating the normal disconnection process of the module 10 according to the present embodiment. First, the module 10 is connected with the terminal 20 and data communication using first short-range wireless communication is executed between the module 10 and the terminal 20 (step S200). Thereafter, when the connection with the terminal 20 is disconnected when no switching request is received by the switching request receiving unit 13, the connection disconnecting unit 15 transmits a disconnection request to the terminal 20 (step S201). Here, for example, when a user manipulation for issuing an instruction to disconnect the connection to the module 10 or the terminal 20 may be performed or a time-out when a period of non-data-communication is greater than or equal to a fixed period may occur, the connection with the terminal 20 is disconnected when no switching request is received by the switching request receiving unit 13.

Next, the terminal 20 receiving the disconnection request transmits a response to the disconnection request to the module 10 after a disconnection preparation is completed (step S202). Using the reception of the response to the disconnection request from the terminal 20 as a trigger, the connection disconnecting unit 15 disconnects the connection with the terminal 20 (step S203). In this case, the connection disconnecting unit 15 causes the module 10 to transition to the above-mentioned standby state (step S204). Thereafter, the module 10 is in the connection request waiting state in which a connection request using an original connection destination address can be received, for example, using a predetermined user manipulation or the like (for example, the above-mentioned touch manipulation or the like) serving as an initial connection manipulation as a trigger.

On the other hand, the terminal 20 receiving the disconnection request disconnects the connection with the module 10 on the basis of the disconnection request (step S205) and executes a predetermined disconnection process (for example, a preset process such as deletion of user data) (step S206) without executing an unnecessary process of searching for the module 10.

In the module 10 according to the above-mentioned present embodiment, it is possible to increase the speed of connection switching because the address changing unit 14 changes the connection destination address using the reception of the switching request by the switching request receiving unit 13 as a trigger, the connection disconnecting unit 15 forcibly disconnects the connection with one terminal, and the connection process executing unit 16 receives the connection request from the terminal 30 using the changed connection destination address. Also, because the connection destination address is changed, the module 10 is not discovered even when the terminal 20 searches for the module 10 using the connection destination address before the change. As a result, it is possible to prevent the terminal 20 from being re-connected to the module 10. Thus, according to the module 10, it is possible to reliably and rapidly perform switching between the terminals 20 and 30 to be connected.

Also, in the module 10, the address changing unit 14 changes the connection destination address and notifies the terminal 30 of the changed connection destination address. Accordingly, the module 10 can reliably transfer the changed connection destination address necessary to connect to the communication device to the terminal 30 serving as a connection switching destination at an appropriate timing and more reliably execute connection switching for the terminal 30.

Also, according to the module 10, the address changing unit 14 can immediately change the connection destination address to the changed destination address and notify the terminal 30 of the changed destination address using the reception of the switching request as a trigger by pre-retaining the changed destination address in the memory 10B or the like so that the changed destination address can be referred to. That is, the address changing unit 14 can shorten a processing time related to the change of the connection destination address because it is unnecessary to execute a process of calculating an address of a changed destination when the switching request is received. As a result, it is possible to further increase the speed of connection switching.

Also, according to the module 10, the switching request for the terminal 30 is received using the second short-range wireless communication different from the first short-range wireless communication. Thereby, for example, even when the connection with the module 10 using the first short-range wireless communication is occupied by the terminal 20 and the terminal 30 cannot be connected with the module 10 using the first short-range wireless communication, the module 10 can receive a switching request from the terminal 30. Also, for example, even when an authentication process (for example, an input of a password or the like) for establishing a connection using the first short-range wireless communication is necessary, the module 10 can further increase the convenience of the user because a process of exchanging information necessary for the authentication process at a time of the switching request using the second short-range wireless communication can be implemented.

Modified Example

Next, a modified example of the module 10 will be described. As illustrated in FIG. 1, a module 110 according to the modified example is different from the module 10 in that a connection disconnecting unit 115 is provided in place of the connection disconnecting unit 15 and is similar to the module 10 in terms of the remaining components. In a different aspect from the connection disconnecting unit 15, the connection disconnecting unit 115 forcibly disconnects a connection with the terminal 20. That is, when a connection destination address is changed by the address changing unit 14, the connection disconnecting unit 115 notifies the terminal 20 that the connection is disconnected and disconnects the connection with the terminal 20 using the notification as a direct trigger. The connection disconnecting unit 115 is different from the connection disconnecting unit 15 in that a notification indicating that a disconnection is performed (a disconnection notification) is transmitted to the terminal 20, but is the same as the connection disconnecting unit 15 in that the connection with the terminal 20 is unilaterally disconnected without obtaining a response (a confirmation) indicating that the connection from the terminal 20 may be disconnected.

Information included in the disconnection notification may be the same as the information included in the disconnection request transmitted in the above-mentioned normal disconnection process. However, in this case, because the module 10 disconnects the connection without waiting for a response indicating that the connection with the terminal 20 may be disconnected, a response from the terminal 20 is not received by the module 10 and becomes an ineffective process. Therefore, the disconnection notification may include, for example, information indicating that a response is unnecessary for the terminal 20. In this case, the terminal 20 receiving the disconnection notification does not make an ineffective response for the module 10.

Figure 5:
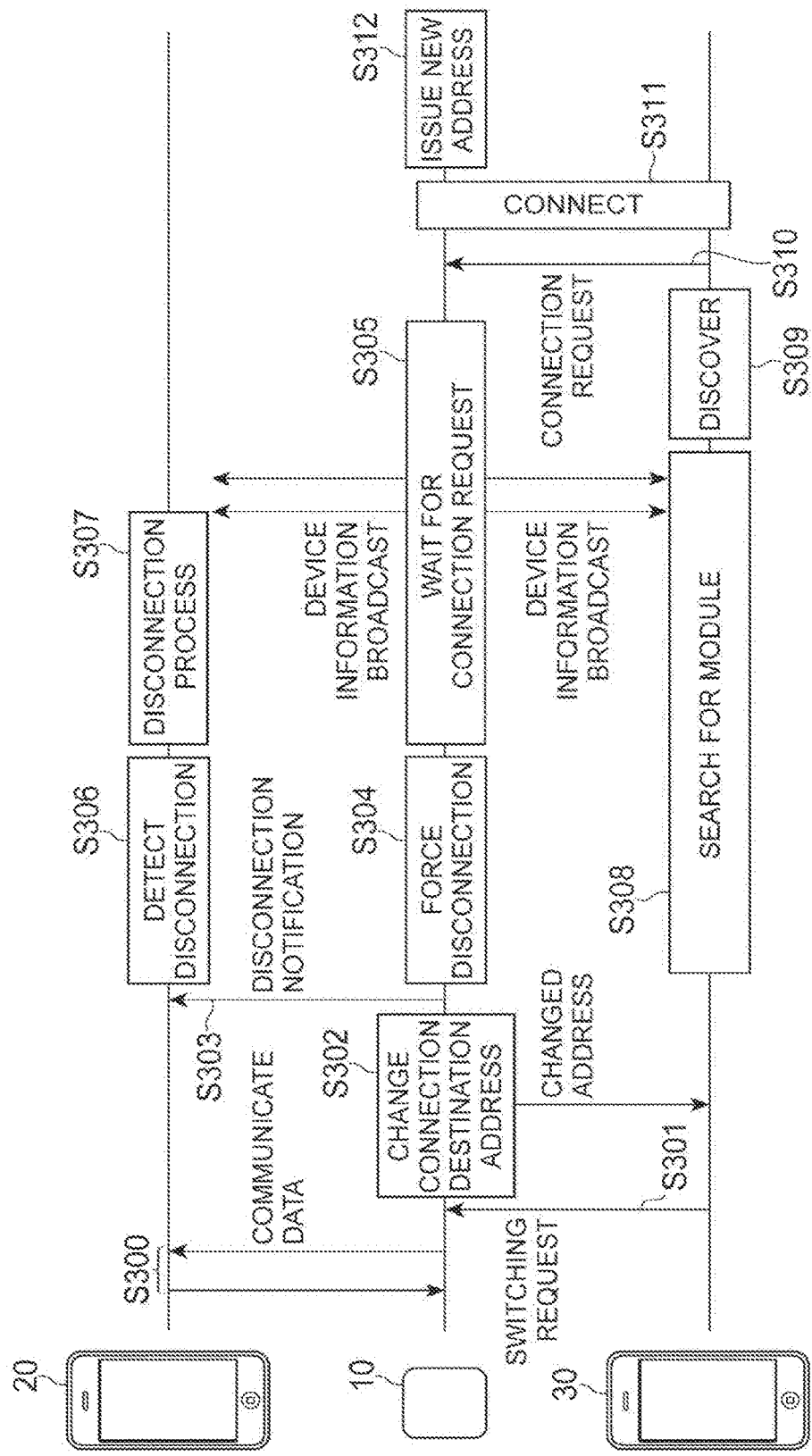
FIG. 5 is a sequence diagram illustrating a series of processes related to connection switching of a module according to a modified example.

A connection switching process of the module 110 will be described using FIG. 5. FIG. 5 is a sequence diagram illustrating a series of processes related to connection switching of the module 110 according to the modified example. Here, processes other than a process of sending a disconnection notification when a connection destination address is changed (step S303) and a process of the terminal 20 which receives the disconnection notification (steps S306 and S307) are similar to the connection switching process of the module 10 illustrated in FIG. 3. That is, processes of steps S300 to S302 are similar to those of steps S100 to S102 illustrated in FIG. 3, processes of steps S304 and S305 are similar to those of steps S103 and S104 illustrated in FIG. 3, and processes of steps S308 to S312 are similar to those of steps S108 to S112 illustrated in FIG. 3. Consequently, the processes S303, S306, and S307 will be mainly described hereinafter.

When the address changing unit 14 changes the connection destination address (step S302), the connection disconnecting unit 115 transmits a disconnection notification to the terminal 20 (step S303). The terminal 20 receiving the disconnection notification detects the disconnection from the module 10 after finding that the connection with the module 10 is disconnected using the disconnection notification (step S306). Thereby, the terminal 20 executes a predetermined disconnection process (for example, a preset process such as deletion of user data or the like) without executing an ineffective search for the module 10 (step S307).

According to the module 110 according to the above-mentioned modified example, a notification indicating that the connection with the terminal 20 is disconnected (the disconnection notification) is provided before the connection with the terminal 20 is disconnected. Thereby, it is possible to cause the terminal 20 to find that the connection with the module 10 is disconnected. As a result, it is possible to prevent an ineffective process of searching for the module 10 and save power of the terminal 20. On the other hand, because the module 10 disconnects the connection with the terminal 20 without waiting for a response to the disconnection notification from the terminal 20 (step S304) and is in a state in which a connection request using a changed connection destination address can be received (step S305), the speed of the connection switching can also increase.

The present invention has been described above in detail on the basis of embodiments. However, the present invention is not limited to the above-mentioned embodiments. The present invention can have various modifications without departing from the scope of the invention.

For example, in the present embodiment, a configuration in which the address changing unit 14 pre-acquires the changed destination address of the connection destination address while the communication device is connected to the terminal 20 and retains the changed destination address so that the changed destination address can be referred to has been described. However, the address changing unit 14 may be configured to calculate the changed destination address by executing a predetermined calculation or the like when the switching request is received. Even in such a configuration, there is an advantageous effect in that the speed of connection switching can increase by omitting a process of waiting for a response after issuing a disconnection request to the terminal 30.

Also, a configuration in which the address changing unit 14 changes the connection destination address and notifies the terminal 30 of the changed connection destination address has been described in the present embodiment. However, for example, a configuration in which the terminal 30 transmits the address designated by the terminal 30 side together with the switching request to the module 10, and the module 10 sets the address to the changed connection destination address may be made. In this case, a process in which the address changing unit 14 notifies the terminal 30 of the connection destination address is unnecessary.

Also, the case in which the first short-range wireless communication is Bluetooth (registered trademark) and the second short-range wireless communication is NFC has been described in the present embodiment, but a combination of the first and second short-range wireless communication is not limited thereto. Also, a touch manipulation using the second short-range wireless communication in the present embodiment triggers a transmission of a switching request from the terminal 30 to the module 10 in the present invention, but any one may serve as a trigger of the transmission of the switching request.

Also, a configuration in which the module 10 provides information necessary for mobile network communication to the terminals 20 and 30 connected to the communication device has been described in the present embodiment, but functions to be provided to the terminals 20 and 30 by the module 10 are not limited thereto. The module 10 can perform data transmission/reception related to various services for the terminals 20 and 30 connected to the communication device. Also, the case in which the number of opposing terminals to the module 10 is two (the terminals 20 and 30) has been described in the present embodiment, but the number of opposing terminals to the module 10 may be three or more.

REFERENCE SIGNS LIST

10, 110 Module (communication device)
11 First short-range wireless communication unit
12 Second short-range wireless communication unit
13 Switching request receiving unit
14 Address changing unit
15, 115 Connection disconnecting unit
16 Connection process executing unit
20 Terminal (one terminal)
30 Terminal (other terminal)

The invention claimed is:

1. A communication device for performing data communication by connecting with a terminal using short-range wireless communication via a preset connection destination address associated with the communication device, the communication device comprising:
    circuitry configured to:
        receive, when the communication device is connected with one terminal, a switching request indicating a connection switching to another terminal;
        change the connection destination address using the reception of the switching request as a trigger;
        notify the other terminal of the changed connection destination address;
        forcibly disconnect the connection with the one terminal from the communication device when the connection destination address is changed; and
        receive a connection request from the other terminal with the changed connection destination address after the connection with the one terminal is disconnected and connect with the other terminal.

2. The communication device according to claim 1,
    wherein while the communication device is connected with the one terminal, the circuitry is further configured to pre-acquire a changed destination address of the connection destination address and retain the changed destination address so that the changed destination address can be referred to, and
    wherein using the reception of the switching request as the trigger, the circuitry is further configured to change the connection destination address to the changed destination address and notify the other terminal of the changed destination address as the changed connection destination address.

3. The communication device according to claim 1, wherein the circuitry is further configured to notify the one terminal that the connection is disconnected and disconnect the connection with the one terminal using the notification as a direct trigger when the connection destination address is changed.

4. The communication device according to claim 1, wherein the circuitry is configured to transmit a disconnection request to the one terminal and disconnect the connection with the one terminal using a reception of a response to the disconnection request from the one terminal as a trigger if the connection with the one terminal is disconnected when the switching request is not received.

5. The communication device according to claim 1, wherein the circuitry is further configured to:
    receive, when the communication device is connected with the one terminal using first short-range wireless communication, the switching request indicating a connection switching to the other terminal using second short-range wireless communication different from the first short-range wireless communication,
    notify the other terminal of the changed connection destination address using the second short-range wireless communication, and
    receive the connection request from the other terminal with the changed connection destination address using the first short-range wireless communication and connect with the other terminal using the first short-range wireless communication.

6. A communication control method to be executed by a communication device for performing data communication by connecting with a terminal using short-range wireless communication via a preset connection destination address associated with the communication device, the communication control method comprising:
    receiving, when the communication device is connected with one terminal, a switching request indicating a connection switching to another terminal;
    changing a connection destination address using the reception of the switching request as a trigger;
    notifying the other terminal of the changed connection destination address;

forcibly disconnecting the connection with the one terminal from the communication device when the connection destination address is changed; and receiving a connection request from the other terminal with the changed connection destination address after the connection with the one terminal is disconnected and connecting with the other terminal.

* * * * *